United States Patent
Reineck

(10) Patent No.: US 6,871,864 B2
(45) Date of Patent: Mar. 29, 2005

(54) TRAILING ARM SUSPENSION ANTI-ROLL BAR

(75) Inventor: Benjamin R. Reineck, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 75 days.

(21) Appl. No.: 10/194,780

(22) Filed: Jul. 12, 2002

(65) Prior Publication Data

US 2004/0007844 A1 Jan. 15, 2004

(51) Int. Cl.$^7$ .............................................. B60G 21/055
(52) U.S. Cl. ......................... 280/124.107; 280/124.106
(58) Field of Search ................... 280/124.107, 124.106, 280/124.149, 124.152, 124.13

(56) References Cited

U.S. PATENT DOCUMENTS

| | | | | |
|---|---|---|---|---|
| 3,292,944 | A | * 12/1966 | Dangauthier | 280/124.107 |
| 4,486,030 | A | * 12/1984 | Takata et al. | 280/124.107 |
| 5,039,124 | A | * 8/1991 | Widmer | 280/124.116 |
| 6,508,482 | B2 | * 1/2003 | Pierce et al. | 280/124.116 |
| 6,523,841 | B2 | * 2/2003 | Gläser et al. | 280/124.106 |
| 6,533,300 | B1 | * 3/2003 | Hicks et al. | 280/124.106 |
| 6,607,205 | B2 | * 8/2003 | Platner | 280/124.116 |

FOREIGN PATENT DOCUMENTS

WO    WO 01/38113    5/2001

OTHER PUBLICATIONS

"ADL Series Drive Axle Air-Ride Suspension", Freightliner, Nov. 2001, pp. 1–2, Muskegon, Michigan.

U.S. patent application: "Suspension Trailing Arm", filed on Jul. 12, 2002. Inventor Benjamin R. Reineck.

U.S. patent application: "Heavy Duty Trailing Arm Suspension System", filed Jul. 12, 2002. Inventor Benjamin R. Reineck.

* cited by examiner

*Primary Examiner*—Charles T. Jordan
*Assistant Examiner*—Bret Hayes
(74) *Attorney, Agent, or Firm*—Carlson, Gaskey & Olds, P.C.

(57) ABSTRACT

A trailing arm suspension is provided for use in a heavy-duty vehicle. The suspension includes a frame and a pair of spaced apart trailing arms that each include a forward portion pivotally supported by the frame. The trailing arms extend longitudinally from the forward portion to a rearward portion. An anti-roll bar includes opposing end portions and a central portion transverse to and extending between the end portions. The end portions are respectively arranged longitudinally along a portion of the trailing arms and are pivotally secured respectively to the trailing arms. The end portions may be secured to the trailing arms by threaded fasteners and further supported on the trailing arm by a bracket having a bushing. At least a portion of the end portion is received in a pocket or channel in the trailing arm so that the end portion does not extend below the trailing arm.

13 Claims, 2 Drawing Sheets

TRAILING ARM SUSPENSION ANTI-ROLL BAR

BACKGROUND OF THE INVENTION

This invention relates to a heavy-duty trailing arm suspension system, and more particularly, the invention relates to an anti-roll bar suitable for a heavy duty trailing arm suspension system.

Suspension systems utilize anti-roll bars to stabilize the vehicle during a turning maneuver. One conventional type of anti-roll bar utilized on passenger vehicles includes ends that are secured to a suspension component such as a lower control arm. A central portion extends between the ends and is supported on the frame of the vehicle by brackets and bushings.

As the control arms move during a turning maneuver, the anti-roll bar rotationally deflects and acts against the frame to provide vehicle stability. Supporting an anti-roll bar by a frame for heavy duty vehicle applications is not practical since the suspension components may be spaced a significant distance from the frame so that a portion of the frame may not be located sufficiently close to the anti-roll bar.

A heavy-duty trailing arm suspension system has been proposed that utilizes a torque tube extending between the trailing arms. The torque tube is welded to an adaptor plate that is supported by numerous bushings. To service the torque tube, the adapted plate and all of the supported suspension components must be removed. The adaptor plate supports many other suspension components such as a shock absorber and/or air spring. The adaptor plate may also support the axle. As a result, the numerous bushings receive load inputs from various components. Accordingly, it is difficult to isolate any one bushing to optimize the roll characteristics.

Therefore, what is needed is an anti-roll bar for a heavy duty trailing arm suspension system that is serviceable, without adversely affecting the ground clearance of the suspension system.

SUMMARY OF THE INVENTION AND ADVANTAGES

The present invention provides a trailing arm suspension for use in a heavy-duty vehicle. The suspension includes a frame and a pair of spaced apart trailing arms that each include a forward portion pivotally supported by the frame. The trailing arms extend longitudinally from the forward portion to a rearward portion. An anti-roll bar includes opposing end portions and a central portion transverse to and extending between the end portions. The end portions are respectively arranged longitudinally along a portion of the trailing arms and are pivotally secured respectively to the trailing arms. The end portions may be secured to the trailing arms by threaded fasteners and further supported on the trailing arm by a bracket having a bushing. At least a portion of the end portion is received in a pocket or channel in the trailing arm so that the end portion does not extend below the trailing arm.

Accordingly, the above invention provides an anti-roll bar for a heavy duty trailing arm suspension system that is serviceable without adversely affecting the ground clearance of the suspension system.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
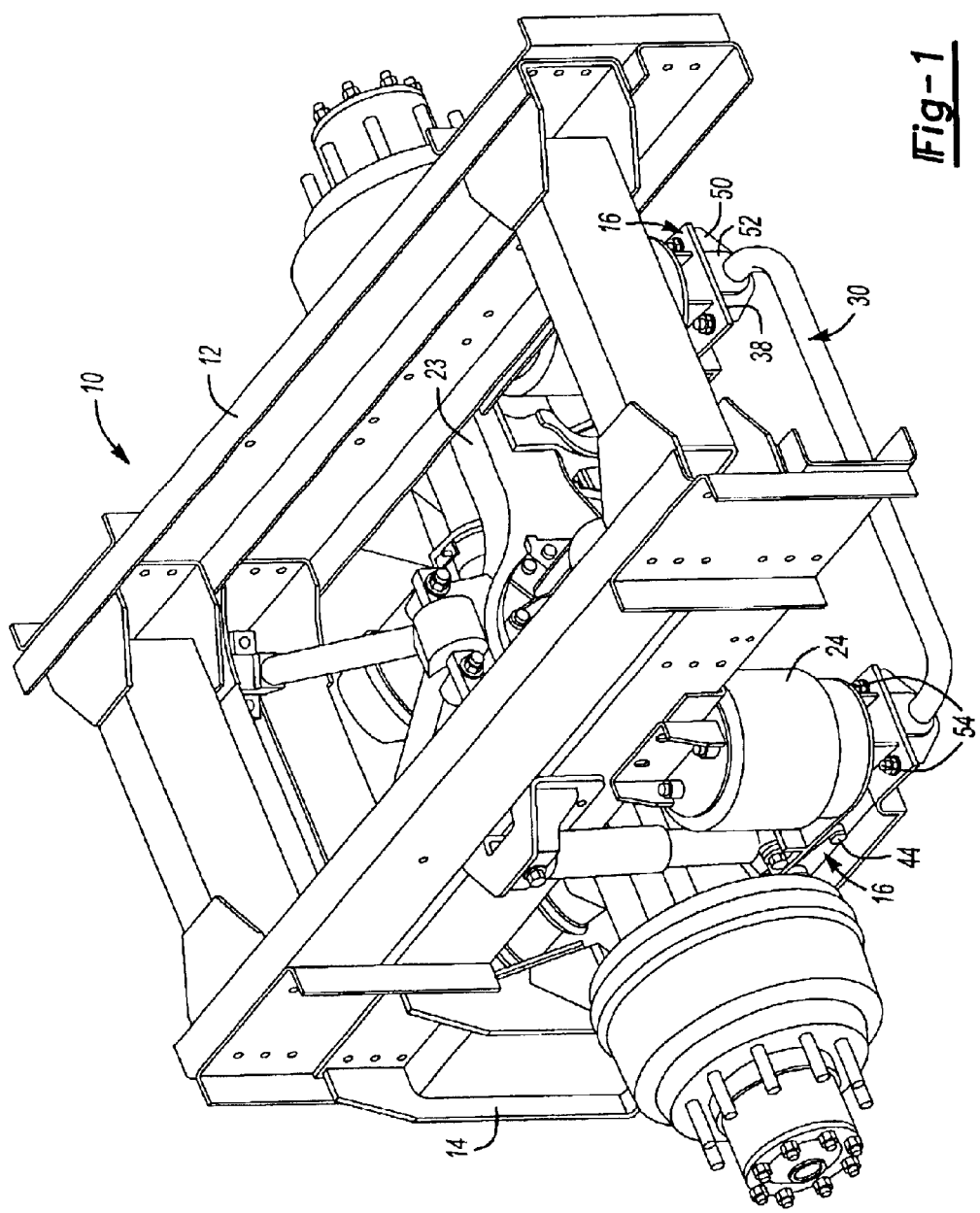
FIG. 1 is a top perspective view of a heavy duty trailing arm suspension system.
Figure 2:
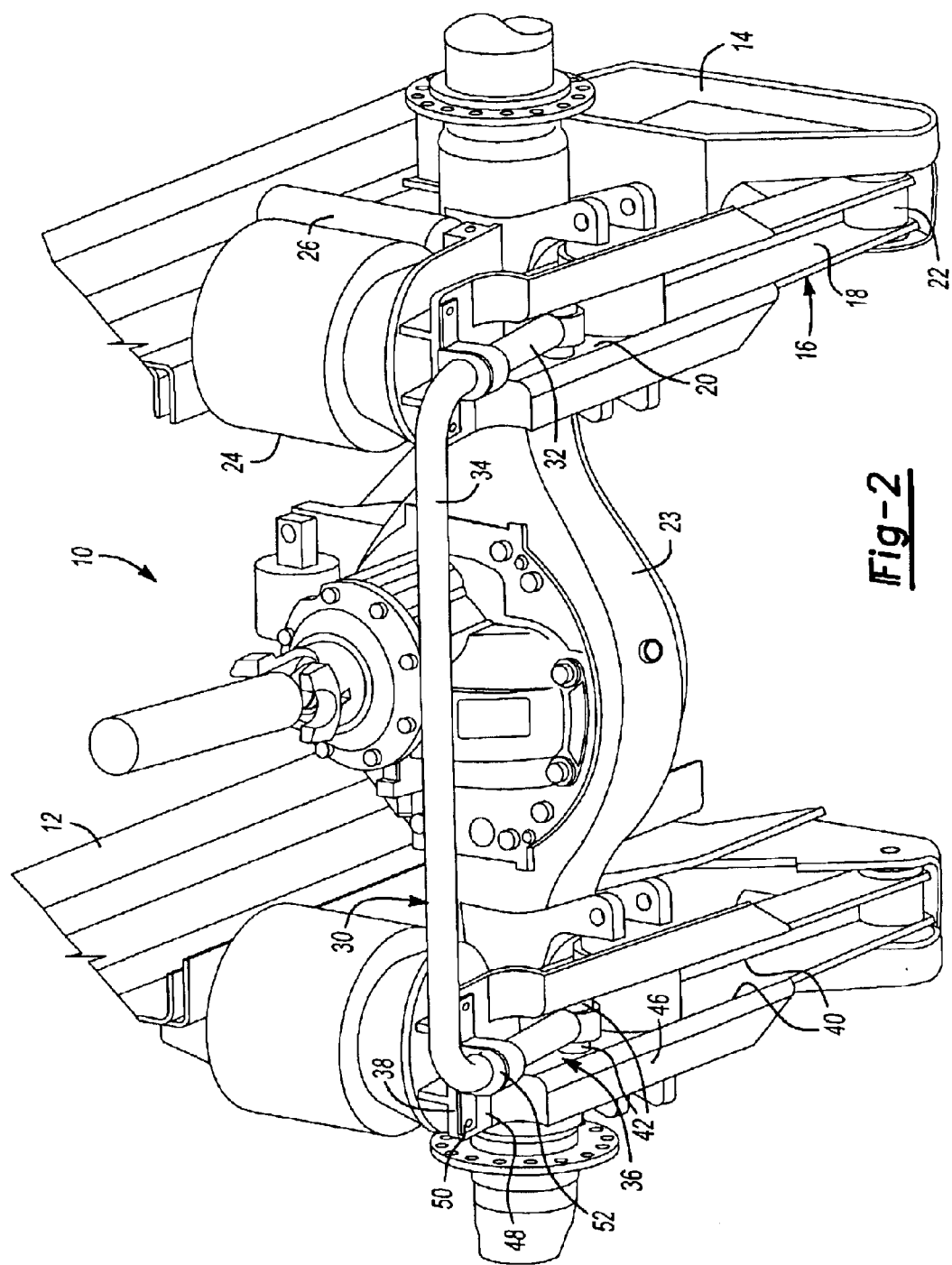
FIG. 2 is a bottom perspective view of the suspension system shown in FIG. 1.

A heavy-duty suspension system is shown at 10 in FIGS. 1 and 2. The suspension 10 includes a frame 12 that may include any number of brackets 14 and other structural support members. The suspension 10 shown is suitable for use in such heavy-duty applications such as motor homes. The suspension 10 includes trailing arms 16 having forward portions 18 that are secured to the brackets 14 at first pivotal connections 22 by threaded fasteners. The trailing arms 16 extend from the forward portions 18 to rearward portions 20. The trailing arm is preferably formed from a thick metal forming and attachment features welded to the arm.

An axle 23, such as the drive axle shown, is pivotably supported on the trailing arms 16 by brackets and pins (not shown). For motor home applications a combustion engine may be arranged rearward of the suspension 10 to provide rotational drive to the drive axle 23. An air spring 24 and shock absorber 26 may be arranged between each of the trailing arms 16 and the frame 12.

An anti-roll bar 30 is arranged laterally between the trailing arms 16 and is preferably connected between the rearward portions 20. The anti-roll bar 30 may include end portions 32 and a central portion 34 transverse to and extending between the end portions 32. The central portion 34 may be bent in any suitable shape. The trailing arms 16 may include a pocket 36 or channel opening downward and receiving the end portions 32. The end portions 32 extend longitudinally generally in the same longitudinal direction as the trailing arms 16. The end portions 32 are preferably located approximately beneath the air springs. Each of the rearward portions 20 includes a terminal end 38 with the bar 30 preferably extending rearwardly beyond the terminal ends 38.

The trailing arms 16 may include sidewalls 40 partially defining the pocket 36. The spaced apart bushings 42 may be received in the sidewalls 40 defining second pivotal connection. A threaded fastener 44, best shown in FIG. 1, is disposed within the bushings 42 to pivotally secure the end portions 32 to the trailing arms 16. The trailing arms 16 have a bottom surface 46 defining a lower plane. The bottom surface 46 may be lateral walls extending outwardly from the sidewalls 40 or the edges of the sidewalls. An anti-roll bar support plate 48 may include a portion spaced upwardly from the lower plane and secured to each of the trailing arms 16 by welding. Brackets 50 having flexible bushings 52 may additionally support the end portions 32 to the trailing arm 16. The brackets 50 may be secured to the trailing arms 16 by fasteners 54, as best shown in FIG. 1. The brackets 50 are spaced rearwardly from the second pivotal connections. The anti-roll bar 30 may be serviced by removing the fasteners 44 and 54.

During operation of the suspension such a turning maneuvers, the end portions 32 undergo torsion. The central portion 34 also undergoes torsion as well as bending. The present invention anti-roll bar configuration provides increased stiffness as compared to prior art configurations.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A trailing arm suspension for use in a heavy duty vehicle comprising:

a frame;

a pair of spaced apart trailing arms each including a forward portion pivotally supported by said frame and extending longitudinally to a rearward portion; and an anti-roll bar having opposing end portions and a central portion transverse to and extending between said end portions, said end portions respectively arranged longitudinally along a portion of said trailing arms and pivotally secured respectively to said trailing arms.

2. The suspension according to claim 1, wherein said rearward portions of said trailing arms include a pocket opening downward away from said frame with at least a portion of said end portions received in said pockets.

3. The suspension according to claim 2, wherein said rearward portions include side walls at least partially defining said pockets wit each side wall having a bushing and a pivotal connection disposed in said bushings and supporting said end portions.

4. The suspension according to claim 2, wherein said rearward portions include a bottom surface defining a lower plane with said end portions arranged above said lower planes.

5. The suspension according to claim 4, wherein said rearward portions include a support plate having a portion spaced upwardly from said lower planes with a bracket secured to said support plates and supporting said end portions.

6. The suspension according to claim 5, wherein said brackets includes a bushing receiving said end portions.

7. The suspension according to claim 1, wherein said suspension includes air springs interposed between said frame and said trailing arms, said end portions arranged approximately beneath said air springs.

8. The suspension according to claim 1, wherein said trailing arms include terminal ends opposite said forward portion with said anti-roll bar extending beyond said terminal ends.

9. A method of manufacturing a heavy-duty trailing arm suspension comprising the steps of:

a) securing trailing arms to a frame by first pivotal connections;

b) securing end portions of an anti-roll bar to the trailing arms by second pivotal connections; and c) securing the end portions to the trailing arms by brackets spaced from the second pivotal connections.

10. The method according to claim 9, wherein the securing of steps b) and c) utilizes threaded fasteners.

11. The method according to claim 9, wherein the end portions extend longitudinally along the trailing arms.

12. The method according to claim 9, wherein bushings are welded to the trailing arms to receive the second pivotal connections.

13. The method according to claim 9, wherein a support plate is welded to the trailing arms to receive the brackets.

* * * * *